United States Patent
Alfredsson

[15] 3,666,080
[45] May 30, 1972

[54] CONVEYOR BELT SYSTEM

[72] Inventor: Stig Allan Junior Alfredsson, Sandviken, Sweden

[73] Assignee: Sandviken Jernverks Aktiebolag, Sandviken, Sweden

[22] Filed: Nov. 14, 1969

[21] Appl. No.: 876,967

[30] Foreign Application Priority Data

Apr. 28, 1969 Sweden....................................5979/69

[52] U.S. Cl..................................198/38, 198/81, 198/188, 324/45
[51] Int. Cl........................................................B65g 43/00
[58] Field of Search..........................198/38, 188, 81; 324/45

[56] References Cited

UNITED STATES PATENTS

| | | | |
|---|---|---|---|
| 3,173,533 | 3/1965 | Zuck | 198/38 |
| 3,084,784 | 4/1963 | Zoubek | 198/38 |
| 2,784,851 | 3/1957 | Bretschneider | 198/38 UX |
| 3,219,909 | 11/1965 | Foster | 324/45 X |
| 3,019,385 | 1/1962 | Kalbfell | 198/38 UX |
| 3,275,123 | 9/1966 | Prosser et al. | 198/38 |
| 3,214,003 | 10/1965 | Wilson | 198/38 |

Primary Examiner—Harvey C. Hornsby
Assistant Examiner—Merle F. Maffei
Attorney—Curtis, Morris & Safford

[57] ABSTRACT

A system is disclosed for controlling the discharge of articles from a steel belt conveyor. When articles are placed on the belt at the loading station, the belt is magnetized at a high intensity in a very small area which has a predetermined relationship, longitudinally of the belt, to the position of the article on the belt. The magnetized spot is also positioned transversely of the belt in accordance with the station where the article is to be discharged. At each discharge station there is an arrangement in the form of a plow and means to move the plow to and from the path of articles carried on the belt so as to deflect the articles from the belt. The plow operating mechanism has an electronic control which includes a Hall-effect transducer positioned adjacent the bottom surface of the belt and relatively positioned transversely of the belt along the path of the magnetized spots for that station. Hence, when an article is placed on the belt and the magnetized spot is produced corresponding to a particular unloading station. The article will be carried to that station and unloaded. The high intensity magnetization is produced by an electromagnet extending transversely from the bottom surface of the belt, and direct current is supplied to the electromagnet coil from a condenser circuit. The current can be caused to flow in either direction through the coil so as to produce a magnetized zone or spot of either north or south polarity. The magnetized zone or spot is surrounded by a ring of the opposite polarity but of insufficient intensity to energize the Hall-effect control unit. The number of discharge stations may be increased by producing two or more magnetized spots for various of the discharge stations.

7 Claims, 6 Drawing Figures

3,666,080

INVENTOR:
STIG ALLAN JUNIOR ALFREDSSON

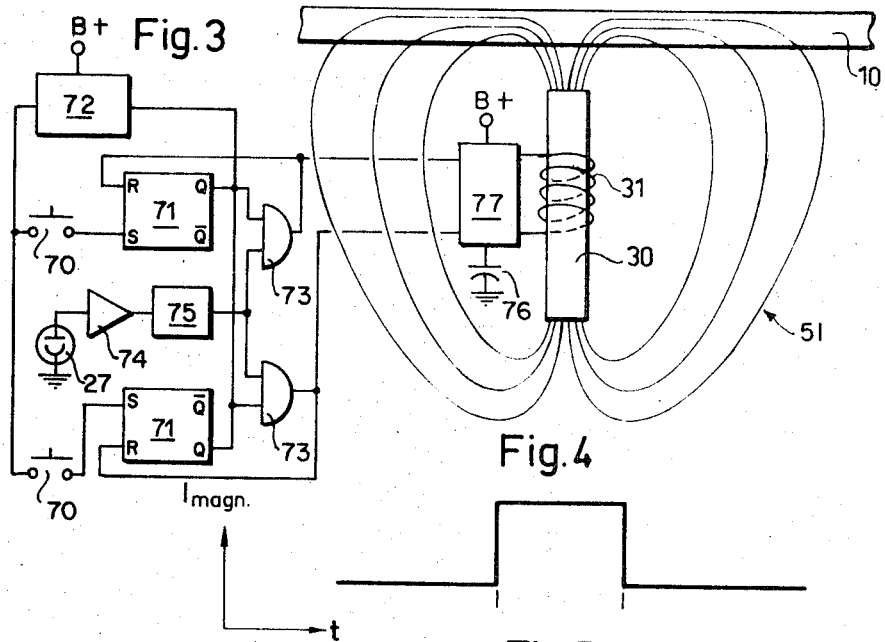
Fig. 3
Fig. 4
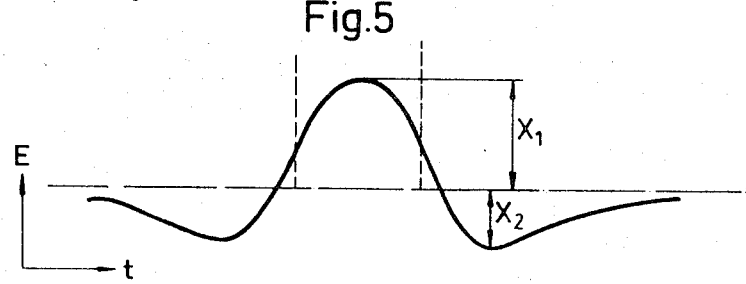
Fig. 5
Fig. 6
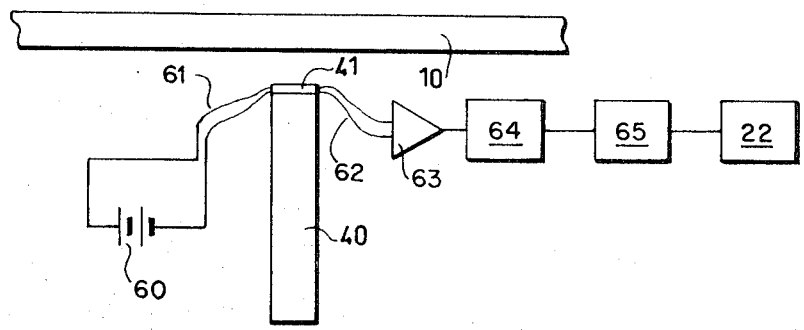
INVENTOR:
STIG ALLAN JUNIOR ALFREDSSON
BY:
Curtis, Morris & Safford
Attorneys

3,666,080

CONVEYOR BELT SYSTEM

This invention relates to steel belt conveyor systems for carrying products from a loading station to delivery stations. The invention relates particularly to systems for controlling the discharge of various products at selected stations along the path of the steel belt conveyor.

An object of this invention is to provide for the efficient and dependable delivery of products from a loading station to various selected discharge stations. A further object is to provide an improved system for controlling steel belt conveyors. A further object is to provide improved means for producing magnetized areas or zones in a conveyor and for utilizing such areas or zones for controlling the conveyor operations. These and other objects will be in part obvious and in part pointed out below.

FIG. 3 is a diagrammatic view, partly in block schematic form, of the magnetization portion of the apparatus according to the present invention;

FIG. 4 is a graph of the magnetization current of the apparatus of FIG. 3;

FIG. 5 is a graph of the output voltage of the Hall-effect transducer portion of the apparatus according to the present invention; and FIG. 6 is a diagrammatic view, partly in block schematic form, of the detection portion of the apparatus according to the present invention.

Figure 1:
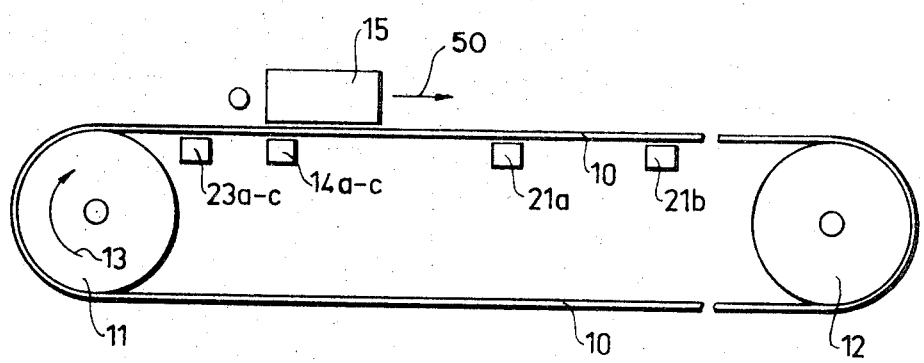
FIG. 1 is a side view of a conveyor belt system according to the present invention.
Figure 2:
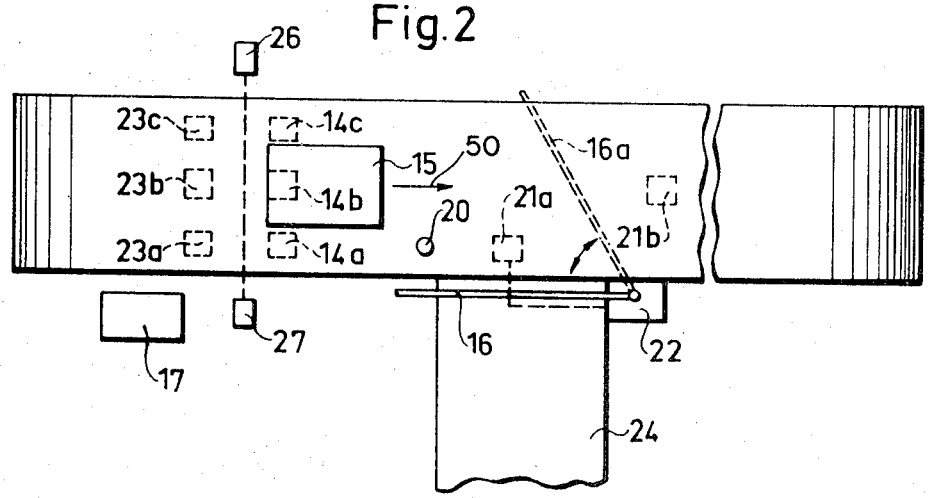
FIG. 2 is a plan view of the apparatus of FIG. 1.

Referring initially to FIGS. 1 and 2, the operation 30 of a conveyor belt system according to the present invention will now be explained by describing, in sequence, the transportation of an article from receipt to delivery. A steel conveyor belt 10 is rotatably mounted on rollers 11 and 12 which are rotated in clockwise direction, indicated by arrow 13, in a conventional manner, so that an article 15, placed upon belt 10, will be transported along the path of belt 10, in the direction indicated by arrow 50. Disposed along the path of, and adjacent to, belt 10 are a plurality of receiving stations, only one of which, receiving station 24, is shown, for selectively receiving the articles transported by the conveyor belt system.

Initially, article 15 is placed upon belt 10 at a location near roller 11. At or before this time, the operator selects the desired receiving station, for example, receiving station 24, for the particular article 15 by feeding this information into a control panel 17. This may be accomplished by providing control panel 17 with a plurality of push buttons or switches, each one corresponding to a particular receiving station, which may be operated to select the appropriate receiving station, or this may be accomplished by other conventional means.

A plurality of electromagnets 14a, 14b, and 14c are disposed in a transverse row beneath belt 10 at a distance along the path of belt 10 from roller 11. A lamp 26 and a photocell 27 are located at opposite sides of, and above the surface of belt 10, between roller 11 and electromagnets 14a, 14b, and 14c. Lamp 26 and photocell 27 are suitably oriented so that the light beam from lamp 26 will impinge upon photocell 27. Photocell 27, control panel 17, and electromagnets 14a, 14b, and 14c are interconnected so that one of the electromagnets 14a, 14b, or 14c will be momentarily energized when article 15 interrupts the path of the light beam from lamp 26 to photocell 27. The particular electromagnet which is energized will correspond with the particular desired receiving station. For example, electromagnet 14a will be energized to obtain the delivery of article 15 to receiving station 24.

The momentary energization of electromagnet 14a results in the creation of a magnetized spot or zone 20 in belt 10. Magnetized spot 20 is located a distance in front of article 15 corresponding to the distance between lamp 26 and photocell 27 and electromagnets 14a, 14b, and 14c. A plurality of magnetic spot detectors, 21a and 21b, of which two are shown, each of which corresponds to a particular receiving station, are located beneath belt 10. Each magnetic spot detector is located in front of its associated receiving station at a distance from the edge of belt 10 corresponding to the distance from the edge of belt 10 to the electromagnet associated with the particular receiving station. For example, magnetic spot detector 21a is located in front of receiving station 24, at a location from the edge of belt 10 corresponding to the location of electromagnet 14a. Magnetic spot 20 will thus pass over magnetic spot detector 21a as belt 10 proceeds along its path.

A pivotable arm or member 16 is located at each receiving station. A pivoting mechanism 22 is connected to arm 16. When energized, pivoting mechanism 22 will cause arm 16 to pivot so that it will align itself diagonally with, and above the surface of, belt 10, causing article 15 to be deflected from belt 10 to receiving station 24. Magnetic spot detector 21a is suitably interconnected with pivoting mechanism 22 so that magnetic spot 20 will cause member 16 to pivot into position in the path of article 15 for an appropriate time to produce the discharge of article 15 onto receiving station 24.

After article 15 has been deposited at receiving station 24, arm 16 is caused to move back to its original position by pivoting mechanism 22. Magnetic spot 20 will remain in belt 10 until such time as it passes over one of a plurality of de-magnetizing coils 23a, 23b, or 23c, energized by AC line current, which are located beneath belt 10, between the receiving stations and photocell 27 and lamp 26. Magnetic spot 20 will thus be de-magnetized, thus returning the system to its initial condition.

In order to increase the number of receiving stations which may be controlled by electromagnets 14a, 14b, and 14c, electromagnets 14a, 14b, and 14c may be energized so as to produce a magnetized spot of either of north or south polarity. Magnetic spot detectors which are sensitive to only one magnetic polarity may then be provided so that a single electromagnet 14a, 14b, or 14c may be used to control the discharge of articles at two receiving stations. The number of receiving stations which may be controlled will thus be twice the number of electromagnets. Furthermore, by placing more than one magnetic spot detector at certain of the receiving stations, the number of possible receiving stations which can be controlled by a given number of electromagnets may be further increased by requiring a particular combination of magnetic spots to energize the particular receiving station.

Referring to FIG. 3, the operation of one of the electromagnets 14a, 14b, or 14c will now be explained. The object of each electromagnet 14a, 14b, 14c is to produce a magnetized spot on belt 10 which is as concentrated and distinct as possible. For this purpose, electromagnet 14a, 14b, or 14c comprises a magnetizable soft iron core 30 located beneath belt 10, at a small distance therefrom. Core 30 is aligned perpendicular to belt 10 to produce optimum concentration of the magnetic field on belt 10. Core 30 may be made of laminated soft iron or other suitable material. Wound about core 30 is a solenoid or coil 31. Energization of coil 31 will produce a magnetic field, indicated by field lines 51, which will enter belt 10 in a concentrated area and will exit belt 10 with reversed polarity dispersed in the surrounding area. If coil 31 is energized by a pulse of sufficient magnitude to produce saturation, a magnetized spot of high intensity will be created in belt 10, surrounded by a larger diffused area of opposite magnetic polarity. The shape of the magnetized spot will depend upon the shape of core 30. Thus, to produce a circular magnetic spot core 30 should be cylindrical in form. However, it may be desirable to produce a magnetic spot which is elongated in the transverse direction of belt 10 in order to enable the spot to impinge upon the corresponding magnetic spot detector regardless of the possible side movement of belt 10. To produce this result, core 30 may be of rectangular cross-section aligned with its longer dimension transverse to the direction of belt 10. The magnetic polarity of the magnetized spot is dependent upon the direction of current flow through coil 31. Thus a single coil may be used to produce magnetic spots of either north or south polarity.

Referring to FIG. 4, the desirable current through coil 31 $I_{magn}$ is shown with respect to time $t$. By so energizing coil 31 with a pulse having sharply defined leading and trailing edges, a high intensity, distinct magnetic spot will be produced on belt 10.

Returning to FIG. 3, the circuitry associated with coil 31 for producing such a magnetizing current $I_{magn}$ will now be explained. Prior to energization of coil 31, the operator depresses one of the momentary contact switches 70. This causes one of the flip-flops 71 to change state. The circuit is thereby conditioned to energize the electromagnet 14a, 14b, or 14c and is prevented from accepting additional input information by a lock-out circuit 72 which supplies the voltage to the momentary contact switches 70. Connected to the outputs of flip-flops 71 are a pair of And gates 73. The output of photocell 27 is amplified by an amplifier 74 and conducted to a monostable multivibrator 75. When the article interrupts the path of the light beam from lamp 26 to photocell 27, monostable 75 is caused to change state. The output of monostable 75 is connected to And gates 73 so that an output will appear at the particular And gate 73 associated with the momentary contact switch 70 which was depressed. The outputs of AND-gates 73 are connected to a switching means 77 which connects a capacitor 76, which has been previously charged to a DC voltage, to coil 31. The direction of the current flow through coil 31 is dependent upon the particular AND-gate 73 which produces output voltage and is thus determined by the particular momentary contact switch 70 that was depressed. Charged capacitor 76 will discharge through coil 31 in accordance with the RLC time constant of coil 31, capacitor 76 and switch means 77 so as to produce a magnetic current $I_{magn}$ which will approximate the desired magnetic current $I_{magn}$ depicted in FIG. 4. To insure substantial discharging of capacitor 76, the RLC time constant is shorter than the period of time during which capacitor 76 is connected to coil 31, corresponding to the time during which monostable 75 is in its activated state. In addition, the outputs of AND-gates 73 serve to reset flip-flops 71, thus returning the circuit to its initial condition. Of course, coil 31 may be energized in an alternate conventional manner.

Referring to FIG. 6, the operation of the magnetic spot detector will now be explained. The magnetic spot detector 21a or 21b comprises a Hall-effect generator 41 located a small distance below belt 10. A core 40 of magnetizable material is disposed below Hall-effect generator 41 in an alignment similar to the alignment of core 30. Core 40 serves to concentrate the magnetic field of the magnetized spot through Hall-effect generator 41. In effect, the magnetic field lines associated with the magnetized spot will be directed by core 40 in directions similar to the magnetic field produced by electromagnet 14a, 14b, 14c. The Hall-effect generator consists of a conductor aligned perpendicular to the magnetic field of the magnetized spot through which a direct current is supplied by a direct current source 60, through input leads 61. When the magnetized spot is present above the Hall-effect generator 41, a voltage will be induced in the conductor which is perpendicular to both the direction of current flow through the conductor and the direction of the magnetic field. This voltage is dependent in amplitude and polarity upon the field strength and magnetic polarity of the magnetized spot. The voltage produced by the Hall-effect generator is conducted to an amplifier 63 through a pair of output leads 62.

FIG. 5 shows the output voltage E of the Hall-effect generator with respect to time $t$. As the magnetized spot passes above Hall-effect generator 41, a voltage of one polarity having an amplitude X2 will be produced by the dispersed magnetic field surrounding the magnetized spot. When the magnetized spot passes directly over Hall-effect generator 41, voltage of opposite polarity having an amplitude of X1 will be produced. Similarly, as the spot passes beyond Hall-effect generator 41, an output voltage of the initial polarity having an amplitude similar to amplitude X2 will again be produced. Since the magnetic field strength of the magnetized spot is substantially greater than the magentic field strength of the surrounding dispersed magnetic area, the amplitude X1 will be substantially greater than the amplitude X2.

In order to provide for magnetic spot detectors which are responsive to only one magentic polarity, so as to enable a single electromagnet to control the operation of two receiving stations, the direction of current flow through the Hall-effect generator may be reversed in those Hall-effect generators which are to react to the opposite magnetic polarity, so that output voltages of similar polarity will be produced by all of the Hall-effect generators when the appropriate magnetic fields are present. This enables the use of identical associated circuitry with all of the Hall-effect generators.

Returning to FIG. 6, the output voltage E of the Hall-effect generator is amplified by amplifier 63 and is conducted to a comparator cirucit 64, which is suitably constructed so as to produce an output signal only upon receipt of an input signal of appropriate amplitude associated with the portion of the output voltage E produced by the magnetic spot. In this manner, the effects of stray magnetic fields present in belt 10 or the surrounding vicinity will be substantially eliminated. The output of capacitor circuit 64 is conducted to a monostable multivibrator which will produce a signal of appropriate duration to energize pivoting mechanism 22 for an appropriate period of time required for the delivery of the article to the receiving station.

The above description of the invention is intended to be illustrative and not limiting. Various changes or modifications in the embodiments described may occur to those skilled in the art, and these can be made without departing from the spirit or scope of the invention as set forth in the claims.

What is claimed is:

1. In a conveyor system, the combination of, a steel belt conveyor having a load carrying run extending from a loading station along a path which passes a plurality of discharge stations, magnetic means at said loading station to produce discrete magnetized zones of high intensity and of single polarity in said belt with the magnetic field extending perpendicular to the belt surfaces with each zone having a selected position with respect to one edge of said belt, and discharge control means including detector means for each of said discharge stations, said detector means including a Hall-effect transducer positioned to detect only the perpendicularly extending magnetic field of said magnetized zones, said control means being operative to discharge products from said belt at a particular one of said discharge stations in accordance with the respective detection of magnetized zones.

2. In a conveyor system, the combination of, an endless steel belt having a run extending from a loading station along a path which passes a plurality of discharge stations, magnetizing means for said loading zone to produce discrete magnetized signal zones each of which comprises a high intensity magnetized zone of single polarity with the magnetic field extending perpendicular to the belt surfaces and a zone of substantially lesser magnetic intensity radially outwardly from said highly magnetized zone, said highly magnetized zone having a selected position with respect to one edge of said belt, and discharge means including means at each of said discharge stations including detector means which is positioned with respect to said edge of said belt so as to be responsive to only the perpendicularly extending magnetic field of one of said high intensity magnetic zones and control means responsive to said detector means to discharge products at each of the discharge stations in accordance with the respective detection of high intensity magnetized zones.

3. A system as described in claim 2 wherein said magnetizing means produces circular high intensity magnetizing zones.

4. A system as described in claim 2 wherein said detector means comprises a Hall effect transducer positioned adjacent to the bottom surface of said belt.

5. In a conveyor system, the combination of an endless conveyor belt having the characteristics that it is magnetizable and positioned with a conveying run extending from a loading station along a path which passes a plurality of discharge stations, magnetizing means for said loading station to produce discrete magnetized signal zones in the belt each of which comprises a magnetic field of single polarity extending perpendicular to the belt surfaces, each of said magnetized zones having a selected position with respect to one edge of the belt and a position longitudinally of the belt relative to the material which is being carried by the belt along said conveying run, and discharge means for the materials including means at each of said discharge stations to discharge the material and detector means which is responsive only to the perpendicularly extending magnetic field of each magnetized zone and control means to operate said discharge means in response to a signal received from said detector means.

6. A conveyor system as described in claim 5 wherein said belt is of steel and wherein said magnetizing means and said detector means are positioned beneath said belt along said conveying run.

7. The method of controlling the delivery of products from a steel belt conveyor which comprises the steps of, magnetizing a discrete spot on the belt with a high intensity magnetic field extending perpendicular to the belt surfaces within a zone at a predetermined distance from a side edge of the belt which has been designated to correspond with a particular discharge station, detecting the arrival of only the perpendicularly extending magnetic field of the spot at said discharge station by a Hall-effect transducer positioned adjacent the bottom surface of the belt, and removing the product from the belt at said discharge station in response to the signal produced by said Hall-effect transducer.

* * * * *